United States Patent
Parehk et al.

(10) Patent No.: US 10,483,558 B1
(45) Date of Patent: Nov. 19, 2019

(54) SYSTEM FOR GENERATING ELECTRICAL POWER FROM FLUE GAS AND CAPTURED CARBON DIOXIDE

(71) Applicants: Vedant Parehk, Upper St. Clair, PA (US); Abhishek Parehk, Upper St. Clair, PA (US)

(72) Inventors: Vedant Parehk, Upper St. Clair, PA (US); Abhishek Parehk, Upper St. Clair, PA (US)

(*) Notice: Subject to any disclaimer, the term of this patent is extended or adjusted under 35 U.S.C. 154(b) by 305 days.

(21) Appl. No.: 15/483,642

(22) Filed: Apr. 10, 2017

Related U.S. Application Data

(60) Provisional application No. 62/320,021, filed on Apr. 8, 2016.

(51) Int. Cl.

| | | |
|---|---|---|
| *H01M 8/00* | (2016.01) | |
| *H01M 6/50* | (2006.01) | |
| *H01M 4/06* | (2006.01) | |
| *F01K 7/16* | (2006.01) | |
| *B01D 53/14* | (2006.01) | |
| *B01D 53/62* | (2006.01) | |

(52) U.S. Cl.
CPC ...... *H01M 6/5077* (2013.01); *B01D 53/1418* (2013.01); *B01D 53/1475* (2013.01); *B01D 53/62* (2013.01); *F01K 7/16* (2013.01); *H01M 4/06* (2013.01); *B01D 2257/504* (2013.01); *Y02C 10/06* (2013.01)

(58) Field of Classification Search
CPC .. H01M 6/5077; H01M 4/06; B01D 53/1418; B01D 53/1475; B01D 53/62; B01D 2257/504; F01K 7/16; Y02C 10/06
See application file for complete search history.

(56) References Cited

U.S. PATENT DOCUMENTS

| | | | |
|---|---|---|---|
| 2010/0038082 A1* | 2/2010 | Zubrin | E21B 43/164 166/268 |
| 2010/0251937 A1* | 10/2010 | Murray | B01D 53/02 106/705 |
| 2010/0314136 A1* | 12/2010 | Zubrin | E21B 43/164 166/402 |
| 2012/0186252 A1* | 7/2012 | Schmidt | F22B 1/18 60/649 |

* cited by examiner

*Primary Examiner* — Jane J Rhee
(74) *Attorney, Agent, or Firm* — Cohen & Grigsby, P.C.

(57) ABSTRACT

A system for collecting flue gas from a combustion process wherein the flue gas has elevated concentrations of carbon dioxide and converting it into electrical power and useful by-products. Kinetic energy of flue gas is used to power a wind turbine that is coupled to a generator to generate electricity. A scrubber isolates CO2 from other components of the flue gas. The CO2 is converted and stored in carbonic acid solution. The carbonic acid solution is then provided to a galvanic cell that generates electrical power and converts the reactant materials in the cell into useful by-products.

11 Claims, 1 Drawing Sheet

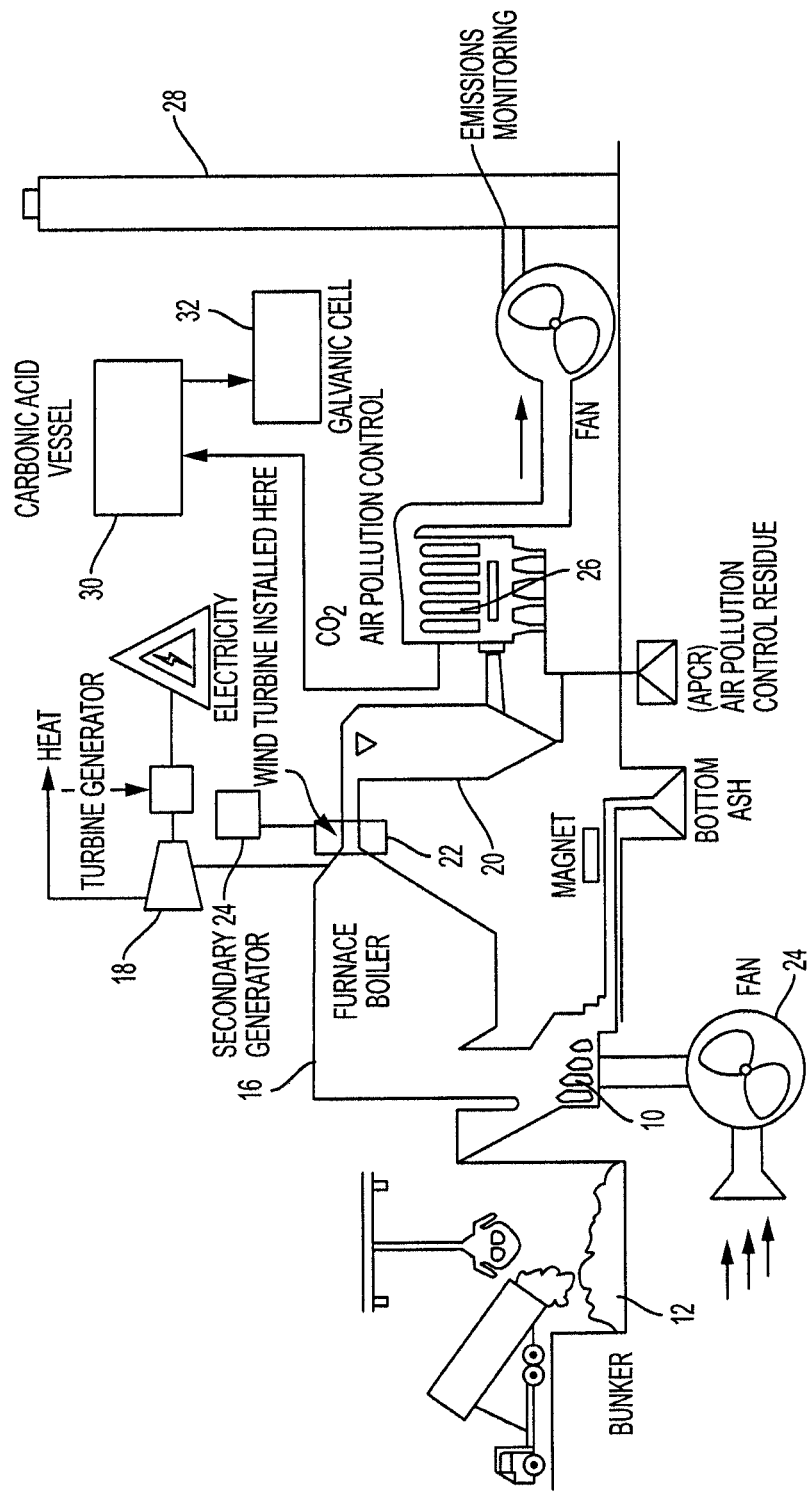

SYSTEM FOR GENERATING ELECTRICAL POWER FROM FLUE GAS AND CAPTURED CARBON DIOXIDE

BACKGROUND OF THE INVENTION

Field of the Invention

The presently disclosed invention relates to electrical power generating systems and, more particularly, systems that generate power from secondary energy and from recovered carbon dioxide.

Discussion of the Prior Art

The prior art has developed systems for generating electrical power from energy produced through the combustion of coal and other carbonaceous fuels. Such systems have sometimes employed turbines and other devices that are powered from off-gases of the combustion process. Those devices are often connected to generators that produce electrical power in response to activation of the device. A difficulty of such secondary systems has been to afford sufficient efficiency that the secondary recovery and use affords a net gain in electrical power production.

Another difficulty with carbonaceous-fueled combustion systems is that they produce relatively high quantities of carbon dioxide. For many years, that carbon dioxide has been delivered to smoke stakes and released into the atmosphere. In recent years, atmospheric levels of carbon dioxide have been rising. In 2013, the concentration of atmospheric $CO_2$ rose to 400 ppm (parts per million). It is thought that elevated levels of atmospheric carbon dioxide have a substantial effect on global climate conditions and, ultimately, may have a profound effect on global average temperatures. It has been estimated that harvesting all the carbon dioxide from homes and power plants could produce about 1,570 terawatts of additional electricity annually—about 400 times the annual electrical output of the Hoover Dam. However, prior art systems and methods for capturing and decomposing carbon dioxide has been expensive and of limited effectiveness.

Accordingly, there was a need in the prior art for a system that would reliably and inexpensively capture carbon dioxide and use it to augment the net electrical power produced at a generating station that is supplied by coal or other carbonaceous fuels.

SUMMARY OF THE INVENTION

In accordance with the presently disclosed invention, a system for generating electric power from the combustion of carbonaceous fuels includes a furnace that produces heat and flue gas from the combustion process. A wind turbine is located in the system to receive flue gas with the velocity of the flue gas being sufficient to turn the wind turbine at a minimum angular rate to generate power from a generator that is coupled to the wind turbine. A scrubber receives flue gas that is generated from the furnace and isolates $CO_2$ from other components of the flue gas. The isolated $CO_2$ is passed to a vessel where it is reacted with water to produce carbonic acid. The carbonic acid is delivered to a voltaic cell with an aluminum anode and a platinum cathode to cause the cell to generate electrical power and to produce aluminum hydroxide and sodium carbonate.

Preferably, the voltaic cell is pressurized to cause greater quantities of $CO_2$ to dissolve as carbonic acid in water and thereby increase the voltage and capacity of the cell.

Other objects and advantages of the presently disclosed invention will be apparent to those skilled in the art as a further description of a presently preferred embodiment of the invention proceeds.

BRIEF DESCRIPTION OF THE DRAWING

A presently preferred embodiment of the disclosed invention is shown and described in connection with the accompanying drawings wherein FIG. 1 is a block diagram of the disclosed system for secondary power generation.

DESCRIPTION OF A PRESENTLY PREFERRED EMBODIMENT

The presently preferred embodiment of the disclosed invention is a system for improving energy production from systems such as power generation and manufacturing facilities that generate electricity from the combustion of carbonaceous fuels. The system also captures and decomposes carbon dioxide released from such combustion processes to reduce carbon dioxide emissions from those sources. The captured carbon dioxide is used to produce electricity and other useful by-products.

The system transfers energy from hot flue gas from the combustion of fossil fuels to a wind turbine. The flue gas passes a turbine-generator to convert kinetic energy in the gas to electric power. Scrubbers that use aqueous ammonia and monoethanolamine (MEA) technology then isolate $CO_2$ from the other flue gas components. To use MEA and/or aqueous ammonia to isolate $CO_2$, the flue gas is chilled so that the solvent (ammonia and monoethanolamine) absorbs the $CO_2$ to form a new compound that separates out from the other flue gases as a more solid state. That compound is reheated to cause the $CO_2$ to come out of solution. The free $CO_2$ is then diverted to a storage vessel that contains DI (deionized) water. The $CO_2$ interacts with the DI water to form carbonic acid that is used as an electrolyte for the cathode half-cell of a galvanic cell.

FIG. 1 is a graphic representation of a coal-fired electric power station. As shown in FIG. 1, a furnace 10 of the fluidized-bed type receives coal or combustible waste with carbonaceous content from a stockpile 12. Furnace 10 also receives air from a fan 14 to promote combustion in the furnace. The furnace heats water in a boiler 16 to produce steam that is fed to a steam turbine-generator set 18. The steam turbine-generator 18 produces the primary electricity output for the power station.

Flue gas from the combustion process in furnace 10 flows to a cyclone separator 20 for separating particulates from the flue gas. A wind turbine 22 is located in the flue gas piping between the furnace and the cyclone. In accordance with the disclosed invention, wind turbine 22 is connected to a secondary generator 24. As flue gas from the furnace forces against the blades of wind turbine 22 to turn wind turbine 22, the wind turbine captures energy from the flue gas and conveys that energy to a generator 24 where it is converted to electrical power. Electrical power from generator 24 is a secondary source of electrical power from the power station.

It is within the scope of the disclosed invention to generate sufficient electrical energy from the secondary source to power a typical household demand of 1265 watts per month. To generate that level of electrical power, it is determined that the minimum velocity of the flue gas must be 13 meters per second assuming that wind turbine 22 has an efficiency of 35%, the density of the flue gas is 1.25 kilogram per cubic meter, and radius of the rotor blades of the wind turbine is 0.915 meters. In some cases, the rotor blades can be oriented in a venturi style.

Again referring to FIG. 1, after the flue gas passes through the cyclone separator 20, it is passed to a scrubber 26 that isolates selected components of the flue gas, including carbon dioxide. The remaining flue gas components from scrubber 26 are then emitted to atmosphere through a stack 28.

Also in accordance with the disclosed invention, the captured carbon dioxide is passed to a vessel 30 and exposed to deionized water to produce carbonic acid. The carbonic acid then may be used in a voltaic cell 32 to generate electrical power.

In an embodiment, the voltaic cell is formed with an aluminum anode and a platinum cathode. The anode electrolyte is aluminum sulfate. The voltaic cell is suitable for using carbonic acid to generate electrical power while consuming CO2. It may be constructed in accordance with the following method. In an aluminum vessel, prepare a volume of aluminum sulfate mixed with deionized water ("DI water") in a ratio of 0.6 g of aluminum sulfate to 200 mL of DI water until the aluminum sulfate is completely dissolved.

In a first inert vessel, sodium chloride is added to DI water in a ratio of 100 mL of DI water to 3.2 grams of sodium chloride to form a solution. A wick or other absorbent material that is saturated with the solution from the first inert vessel is located between the solution in the aluminum vessel and the solution in the first insert vessel to support the passage of electrical current through said wick. An inert electrode such as platinum is located in the solution in the first inert vessel. The reaction in the cell is spontaneous.

CO2 as carbonic acid is the limiting factor for the voltaic cell capacity (Ah) due to the low solubility of CO2 in water. Preferably, CO2 is added to the solution of sodium chloride by percolating the CO2 through the sodium chloride solution. Also, preferably, CO2 is exposed to the sodium chloride solution under conditions of elevated pressure to increase the solubility of CO2 and produce a greater amount of carbonic acid. Most preferably, the CO2 exposure to the sodium chloride solution at elevated pressure is performed under conditions of a high volume of water to increase the ions that are available in solution and thereby increase conductivity in the solution.

It has been determined that if 0.005261 moles of CO2 are dissolved as carbonic acid in water, the disclosed battery will produce 282 mAh of capacity. The pressure required to attain 0.0005261 moles of CO2 is approximately 0.98 MPa. That equates to approximately 142 psi or 9.7 atm. The higher the pressure, the greater capacity of the cell. This is expressed in terms of atmospheres of pressure in the following table:

TABLE 1

| Pressure in atm | Pressure in psi | Moles of $CO_2$ dissolved | Moles of $H_2CO_3$ in solution | Capacity (mAh) |
| --- | --- | --- | --- | --- |
| 18.6 | 285.7 | 0.00985 | 0.00985 | 528 |
| 29.7 | 436.6 | 0.0147 | 0.147 | 788 |
| 39.9 | 585.9 | 0.0188 | 0.0188 | 1008 |
| 46.7 | 686 | 0.0222 | 0.0222 | 1190 |

To dissolve the necessary moles of CO2 as carbonic acid, the quantity of water needed is 48 kg or 13 gallons.

By way of example, an aluminum anode electrode was wetted with aluminum sulfate and a platinum cathode electrode was wetted with carbonic acid solution. The voltage generated by this aluminum-platinum cell is 1.34 volts when 26.8 grams of CO2 was used. Greater consumption of CO2 will yield higher battery voltage. When the cell is pressurized, it will produce sufficient power to supply a typical residence. At the same time, the battery can remove 626 grams per hour of CO2. That removal rate equates to 5.41 tons of CO2 per year.

The voltaic cell also produces several useful by-products. The chemical reaction at the anode side of the voltaic cell produces aluminum hydroxide Al(OH)3—a material that is used in the textile industry and to produce both industrial grade and household ceramics and glass. At the cathode side, the cell produces sodium carbonate Na2CO3—also a useful product with applications in the manufacture of glass, paper, rayon, soaps and detergents. These byproducts make the cost of electricity that is produced by the disclosed voltaic cell very competitive. The table below shows an estimated valuation of the reactant materials the byproducts of the proposed battery.

TABLE 2

| Reactant/By-Products | Quantity, kgs | Price, $ | Total Cost/Sale, $ | Cost of Power, $/kWh | Supplier |
| --- | --- | --- | --- | --- | --- |
| Aluminum (Soda can) | 0.26 | Free | Free | | Recycling Company |
| $Al_2(SO_4)_3$ | 1.62 | $200/ton | $0.32 | | Shanxi Solid Industrial Co. Ltd |
| $CO_2$ | 0.652 | Free | Free | | Industrial flue gas |
| Water | 50 kgs/13 gal | $1.02/100 gal | $0.13 | | PA American Water |
| $Na_2CO_3$ | 4.52 | $150/ton | $0.20 | Sold at 70% discounted | alibaba.com |
| $Al(OH)_3$ | 1.26 | $300/ton | $0.19 | Sold at 50% | alibaba.com |

We claim:

1. A system for generating electrical power by combustion of fuel that includes carbonaceous materials, said system comprising:

a furnace that produces heat and flue gas from the combustion of said fuel;

a wind turbine having blades and a shaft that is connected to said blades, said blades being located in the flow path of said flue gas that is produced from said furnace, said flue gas having sufficient velocity to cause the blades of said turbine to rotate said shaft at an angular velocity that is greater than a predetermined minimum angular velocity;

a generator that is coupled to said shaft of said wind turbine and that produces electrical power in response to the angular movement of said shaft;

a scrubber that receives the flue gas of said furnace after it has passed over the blades of said wind turbine, said scrubber isolating CO2 from said flue gas;

at least one vessel for receiving the CO2 that is isolated by said scrubber, said at least one vessel reacting said CO2 with water under conditions to create carbonic acid; and adding said carbonic acid to a galvanic cell to generate electrical power from said galvanic cell.

2. The system of claim 1 wherein said wind turbine receives flue gas that is flowing at a rate of at least 13 meters per second.

3. The system of claim 1 wherein the blades of said wind turbine are oriented in venturi style.

4. The system of claim 1 wherein said CO2 is reacted with water under pressure that is greater than one atmosphere.

5. The system of claim 1 wherein said CO2 is reacted with water under pressure that is greater than 9 atmospheres.

6. The system of claim 1 wherein said CO2 is reacted with additional water to increase electrical conductivity in the solution.

7. The system of claim 1 wherein said voltaic cell has an anode side that produces aluminum hydroxide.

8. The system of claim 1 wherein said voltaic cell has a cathode side that produces sodium carbonate.

9. The system of claim 7 wherein said anode side of said voltaic cell includes an aluminum anode electrode that is wetted with aluminum sulfate.

10. The system of claim 8 wherein said cathode side of said voltaic cell includes a platinum cathode electrode that is wetted with carbonic acid solution.

11. The system of claim 1 wherein said scrubbers use aqueous ammonia and monoethanolamine as a solvent to isolate CO2 from other components of the flue gas.

\* \* \* \* \*

UNITED STATES PATENT AND TRADEMARK OFFICE
CERTIFICATE OF CORRECTION

PATENT NO. : 10,483,558 B1
APPLICATION NO. : 15/483642
DATED : November 19, 2019
INVENTOR(S) : Parehk et al.

Page 1 of 1

It is certified that error appears in the above-identified patent and that said Letters Patent is hereby corrected as shown below:

On the Title Page

Please correct item (72) to read:
Inventors: Vedant Parekh, Upper St. Clair, PA (US); Abishek Parekh, Upper St. Clair, PA (US)

Signed and Sealed this
Twelfth Day of May, 2020

Andrei Iancu
*Director of the United States Patent and Trademark Office*